United States Patent Office.

MARSHALL TURLY AND BENJAMIN F. THOMAS, OF COUNCIL BLUFFS, IOWA.

Letters Patent No. 105,014, dated July 5, 1870.

IMPROVEMENT IN PRINTERS' INK.

The Schedule referred to in these Letters Patent and making part of the same.

*To all whom it may concern:*

Be it known that we, MARSHALL TURLY and BENJAMIN F. THOMAS, of Council Bluffs, in the county of Pottawattamie and State of Iowa, have invented a new and useful Improvment in Printers' Ink; and we do hereby declare that the following is a full, clear, and exact description thereof, which will enable others skilled in the art to make and use the same.

This invention relates to a new and useful improvement in ink for printers' use, and consists in the material used, and in the manner of its preparation.

In carrying out our invention, we use pitch as it comes from the pine tree, or we use pine-tree rosin.

This we heat in a suitable vessel to about 800° Fahrenheit. This temperature vaporizes the more volatile portion of the pitch or rosin, and produces an inflammable gas.

The liquid pitch, together with the vapor or gas thus generated, we discharge through a tube from fifty to one hundred feet long.

The gas is ignited, and may be allowed to burn at the end of the tube, while the liquid is received into any suitable receptacle.

The coloring-matter is now mixed with the liquid. This consists of charcoal from soft wood, such as pine or bass wood. Any of the various qualities of lamp-black may be employed, if desired.

If the ink at this stage is too viscid or sticky, we add stearine, or other similar material or substance to bring it to the proper consistency for use.

To complete the ink and render it ready for use, we add one pound of white-lead to twenty pounds of the above-described mixture; but we do not confine ourselves to the use of the white-lead, as it is only required for the finer qualities of ink.

Having thus described our invention,

We claim as new and desire to secure by Letters Patent—

1. The above-described process of preparing the fluid body of ink, which consists in volatilizing, by heat, the gaseous products of pitch or rosin, burning the same at the end of a long tube, and passing the liquid portion of said rosin or pitch through the flame, as set forth.

2. As an article of manufacture, printers' ink, formed from pitch and charcoal, in the manner described.

MARSHALL TURLY.
BENJAMIN F. THOMAS.

Witnesses:
E. R. DOWNS,
B. W. HIGHT.